United States Patent
Spector et al.

(10) Patent No.: US 12,226,919 B2
(45) Date of Patent: Feb. 18, 2025

(54) DEVICE AND METHOD FOR TRAINING A MACHINE LEARNING MODEL TO DERIVE A MOVEMENT VECTOR FOR A ROBOT FROM IMAGE DATA

(71) Applicant: Robert Bosch GmbH, Stuttgart (DE)

(72) Inventors: Oren Spector, Modiin Maccabim Reut (IL); Dotan Di Castro, Haifa (IL); Vladimir Tchuiev, Haifa (IL)

(73) Assignee: ROBERT BOSCH GMBH, Stuttgart (DE)

( * ) Notice: Subject to any disclaimer, the term of this patent is extended or adjusted under 35 U.S.C. 154(b) by 121 days.

(21) Appl. No.: 18/174,803

(22) Filed: Feb. 27, 2023

(65) Prior Publication Data
US 2023/0278227 A1  Sep. 7, 2023

(30) Foreign Application Priority Data

Mar. 2, 2022  (DE) ............... 10 2022 202 142.8

(51) Int. Cl.
*G06T 7/70* (2017.01)
*B25J 9/16* (2006.01)

(52) U.S. Cl.
CPC ............... *B25J 9/1697* (2013.01); *G06T 7/70* (2017.01); *G06T 2207/20081* (2013.01); *G06T 2207/20084* (2013.01)

(58) Field of Classification Search
CPC ......... B25J 9/1697; B25J 9/163; G06V 10/82; G06V 2201/06; G06T 7/70; G06T 2207/20084; G06T 2207/20081; G06N 3/09; G05B 2219/40032; G05B 2219/40607; G05B 2219/40584; G05B 2219/39271

See application file for complete search history.

(56) References Cited

U.S. PATENT DOCUMENTS

| | | | |
|---|---|---|---|
| 10,766,136 B1 * | 9/2020 | Porter | G06N 3/045 |
| 10,766,137 B1 * | 9/2020 | Porter | G06N 3/04 |
| 10,792,810 B1 * | 10/2020 | Beckman | B25J 9/163 |
| 10,800,040 B1 * | 10/2020 | Beckman | B25J 9/1605 |
| 10,926,408 B1 * | 2/2021 | Vogelsong | B25J 9/163 |
| 2023/0052634 A1 * | 2/2023 | Tomblin | B29C 65/8253 |

(Continued)

OTHER PUBLICATIONS

Liu et al., Using Unsupervised Deep Learning Technique for Monocular Visual Odometry, 2019, IEEE, p. 18076-18088 (Year: 2019).*

(Continued)

*Primary Examiner* — McDieunel Marc
(74) *Attorney, Agent, or Firm* — NORTON ROSE FULBRIGHT US LLP; Gerard A Messina

(57) ABSTRACT

A method for training a machine learning model to derive a movement vector for a robot from image data. The method includes acquiring images from a perspective of an end-effector of the robot, forming training image data elements from the acquired images, generating augmentations of the training image data elements, training an encoder network using contrastive loss and training a neural network to reduce a loss between movement vectors output by the neural network in response to embedding outputs provided by the encoder network and respective ground truth movement vectors.

8 Claims, 7 Drawing Sheets

(56) References Cited

U.S. PATENT DOCUMENTS

2024/0017408 A1* 1/2024 Attar .............. B25J 9/1687
2024/0273261 A1* 8/2024 Brehmer ............ G06F 30/27

OTHER PUBLICATIONS

Rothfuss et al., Deep Episodic Memory: Encoding, Recalling, and Predicting Episodic Experiences for Robot Action Execution, 2018, IEEE, p. 4007-4014 (Year: 2018).*

Loquercio et al., Learning Depth With Very Sparse Supervision, 2020, IEEE, p. 5542-5549 (Year: 2020).*

Zhang et al., Egocentric Spatial Memory, 2018, IEEE, p. 137-144 (Year: 2018).*

Spector and Di Castro: "InsertionNet—A Scalable Solution for Insertion," IEEE Robotics and Automation Letters, 6(3), (2021), pp. 5509-5516.

Tanwani, et al.: "Sequential robot imitation learning from observations," The Internatioanl Journal of Robotics Research, 40(10-11), (2021), pp. 1-41.

* cited by examiner

DEVICE AND METHOD FOR TRAINING A MACHINE LEARNING MODEL TO DERIVE A MOVEMENT VECTOR FOR A ROBOT FROM IMAGE DATA

CROSS REFERENCE

The present application claims the benefit under 35 U.S.C. § 119 of German Patent Application No. DE 10 2022 202 142.8 filed on Mar. 2, 2022, which is expressly incorporated herein by reference in its entirety.

FIELD

The present invention relates to devices and methods for training a machine learning model to derive a movement vector for a robot from image data.

BACKGROUND INFORMATION

Assembly, such as electrical wiring assembly, is one of the most common manual labour jobs in industry. Examples are electrical panel assembly and in-house switchgear assembly. Complicated assembly processes can typically be described as a sequence of two main activities: grasping and insertion. Similar tasks occur for example in cable manufacturing which typically includes cable insertion for validation and verification.

While for grasping tasks, suitable robot control schemes are typically available in industry, performing insertion or "peg-in-hole" tasks by robots is typically still only applicable to small subsets of problems, mainly ones involving simple shapes in fixed locations and in which the variations are not taken into consideration. Moreover, existing visual techniques are slow, typically about three times slower than human operators.

Therefore, efficient methods for training a controller for a robot to perform tasks like inserting task are desirable.

SUMMARY

According to various example embodiments of the present invention, a method for training a machine learning model to derive a movement vector for a robot from image data is provided comprising acquiring images from a perspective of an end-effector of the robot, forming training image data elements from the acquired images, generating augmentations of the training image data elements to form augmented image data elements, training an encoder network by a first training set of image data elements comprising the training image data elements and the augmented image data elements using contrastive loss, wherein, for an image data element of the first training set, another image data element is a positive sample if the other image data element is an augmentation of the image data element and is a negative sample else, and training a neural network from training data elements of a second training set, wherein each training data element of the second training set comprises at least one respective image data element and a respective ground truth movement vector, by feeding, for each training data element, the at least one image data element to the trained encoder network, inputting an embedding output provided by the encoder network in response to the at least one image data element and training the neural network to reduce a loss between movement vectors output by the neural network in response to the embedding outputs for the training data elements and the respective ground truth movement vectors for the training data elements.

The contrastive loss reduces variance, thereby creating a more robust control policy. Moreover, the size of the second training set can be chosen to be relatively small since by means of the contrastive loss, the encoder network can be trained to provide high-quality embeddings. Also, the contrastive loss enables the use of stronger augmentations in the training.

Various Examples are given in the following.

Example 1 is a method for training a machine learning model to derive a movement vector for a robot from image data as described above.

Example 2 is the method of Example 1, comprising forming the training image data elements to each comprise at least one acquired image and wherein generating the augmentations of the training image data elements comprises at least one of resizing, cropping, colour jittering, translating, rotating, partially erasing, and processing by a random convolution of the at least one acquired image.

These augmentations allow training of the encoder network such that the embeddings generated by the encoder network represent the necessary information for the derivation of movement vectors by the neural network without overfitting to specific image characteristics (which are irrelevant for the derivation of the movement vectors).

Example 3 is the method of Example 1 or 2, comprising forming the training image data elements to each comprise two acquired images, wherein the two acquired images are taking for the same position of the end-effector of the robot by two different cameras attached to the end-effector.

Two cameras (e.g. arranged on opposite sides of a gripper plane of the end-effector) allows bypassing the one image ambiguity problem and extract depth information while avoiding occlusion during the entire insertion trajectory (if one camera's view is occluded, the other one has a clear view). For example, each camera is placed at a 45-degree angle with respect to its respective finger opening, resulting in a good view of the scene as well as of the object between the fingers.

Example 4 is the method of any one of Examples 1 to 3, wherein each training data element of the second training set comprises an image data element and a force and moment input.

Thus, the neural network generates movement vectors from image sensor data and force input data. The force and moment input may specify a force and a moment experienced by the end-effector when one or more images included in the image data element where taken. This provides additional information, e.g. when an object to be inserted into a hole is currently at a rim of the hole, for the neural network to more accurately derive the movement vector.

Example 5 is the method of any one of Examples 1 to 3, wherein each training data element of the second training set comprises two image data elements.

By choosing one image data element to be correspond to a current position and one image data element to correspond to a target position (and training accordingly, i.e. choosing the second training set accordingly), the neural network can thus derive movement vectors to achieve certain targets, in particular for a multi-step task like locking a door.

Example 6 is a robot controller configured to perform a method of any one of Examples 1 to 5.

Example 7 is a robot comprising a robot controller according to Example 6 and comprising an end-effector with at least one camera configured to acquire the images.

Example 8 is a computer program comprising instructions which, when executed by a processor, makes the processor perform a method according to any one of Examples 1 to 5.

Example 9 is a computer readable medium storing instructions which, when executed by a processor, makes the processor perform a method according to any one of Examples 1 to 5.

It should be noted that embodiments and examples of the present invention described in context of the robot are analogously valid for the method for controlling a robot and vice versa.

In the figures, similar reference characters generally refer to the same parts throughout the different views. The figures are not necessarily to scale, emphasis instead generally being placed upon illustrating the principles of the present invention. In the following description, various aspects are described with reference to the figures.

DETAILED DESCRIPTION OF EXAMPLE EMBODIMENTS

The following detailed description refers to the accompanying drawings that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
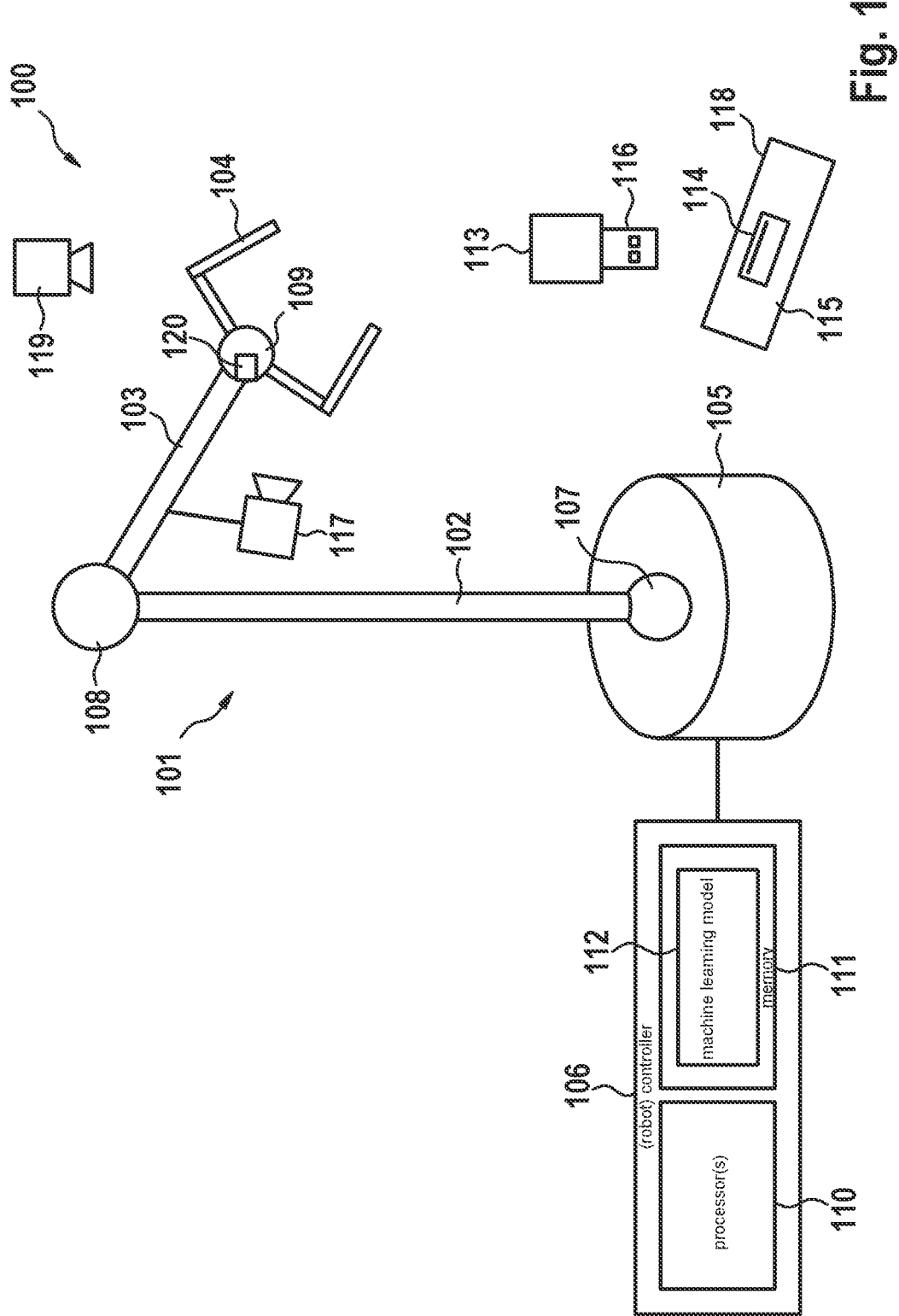
FIG. 1 shows a robot, according to an example embodiment of the present invention.

FIG. 1 shows a robot 100.

The robot 100 includes a robot arm 101, for example an industrial robot arm for handling or assembling a work piece (or one or more other objects). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g. to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm (possibly with a tool at its end).

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e., rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g. an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 106 includes one or more processors 110 and a memory 111 storing code and data according to which the processor 110 controls the robot arm 101. According to various embodiments, the controller 106 controls the robot arm 101 on the basis of a machine learning model 112 stored in the memory 111.

According to various embodiments, the machine learning model 112 is configured and trained to allow the robot 100 to perform an inserting (e.g. peg-in-hole) task, for example inserting a plug 113 in a corresponding socket 114. For this, the controller 106 takes pictures of the plug 113 and socket 114 by means of cameras 117, 119. The plug 113 is for example a USB (Universal Serial Bus) plug or may also be a power plug. It should be noted that if the plug has multiple pegs like a power plug, then each peg may be regarded as object to be inserted (wherein the insertion is a corresponding hole). Alternatively, the whole plug may be seen as the object to be inserted (wherein the insertion is a power socket). It should be noted that (depending on what is regarded as the object) the object 113 is not necessarily completely inserted in the insertion. Like in case of the USB plug, the USB plug is considered to be inserted if the metal contact part 116 is inserted in the socket 114.

Robot control to perform a peg-in-hole task typically involves two main phases: searching and inserting. During searching, the socket 114 is identified and localized to provide the essential information required for inserting the plug 113.

Searching an insertion may be based on vision or on blind strategies involving, for example, spiral paths. Visual techniques depend greatly on the location of the camera 117, 119 and the board 118 (in which the socket 114 is placed in the board's surface 115) and obstructions, and are typically about three times slower than human operators. Due to the limitations of visual methods, the controller 106 may take into account force-torque and haptic feedback, either exclusively or in combination with vision.

Constructing a robot that reliably inserts diverse objects (e.g., plugs, engine gears) is a grand challenge in the design of manufacturing, inspection, and home-service robots. Minimizing action time, maximizing reliability, and minimizing contact between the grasped object and the target component is difficult due to the inherent uncertainty concerning sensing, control, sensitivity to applied forces, and occlusions.

According to various embodiments, a data-efficient, safe and supervised approach to acquire a robot policy is provided. It allows learning a control policy, in particular for a multi-step insertion task, with few data points by utilizing contrastive methodologies and one-shot learning techniques.

According to various embodiments, the training and/or robot control comprises one or more of the following:

1) Usage of two cameras in order to avoid the one image ambiguity problem and to extract depth information. This in particular allows eliminating the requirement to touch the socket's surface 115 when inserting the object 113.
2) Integration of contrastive learning in order to reduce the amount of labelled data.
3) A relation network that enables one-shot learning and multi-step insertion.
4) Multi-step insertion using this relation network.

Figure 2:
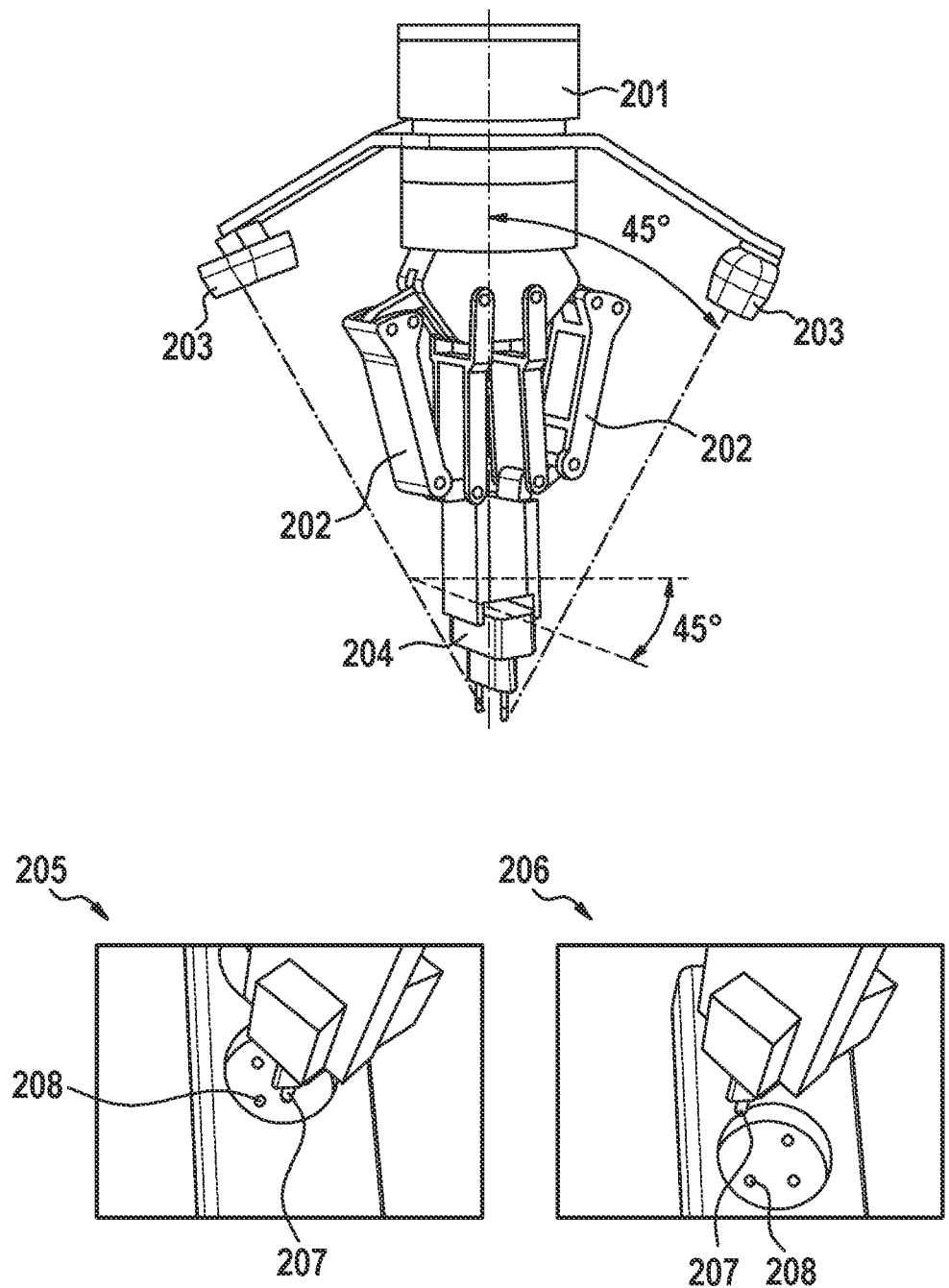
FIG. 2 shows a robot end-effector in more detail, according to an example embodiment of the present invention.

FIG. 2 shows a robot end-effector 201 in more detail.

The end-effector 201 for example corresponds to the end-effector 105 of the robot arm 101, e.g. a robot arm six degrees of freedom (DoF). According to various embodiments, the robot has two sensory inputs which the controller 106 may use for controlling the robot arm 101. The first is stereoscopic perception, provided by two (see item 1 above) wrist cameras 202 tilted at, for example, a 45° angle and focused on a point between the end-effector fingers (EEF) 203.

Images 205, 206 are examples of images taken by the first camera and the second camera respectively for a position of the end-effector 201.

In general, each camera 202 is directed such that, for example, pictures taken show a part (here a pin 207) of an object 204 gripped by the end-effector 201 which is to be inserted and a region around it such that, for example, the insertion 208 is visible. It should be noted that here, the insertion refers to the hole for the pin but it may also refer to comprise the holes for the pins as well as the opening for the cylindrical part of the plug. Inserting an object into an insertion thus does not necessarily mean that the object is completely inserted into the insertion but only one or more parts.

Assuming a height H, width W and three channels for each camera image, an image data element for a current (or origin) position of the robot provided arm is denoted by $\text{Img} \in \mathbb{R}^{H \times W \times 6}$ (having six channels since it includes the images from both cameras 202). The second sensory input is a force input, i.e. measurements of a force sensor 120 which measures a moment and force experienced by the end-effector 105, 201 when it presses the object 113 on a plane (e.g. the surface 115 of the board 118). The force measurement can be taken by the robot or by an external force and torque sensor. The force input for example comprises a force indication $F \triangleq (f_x, f_y, f_z) \in \mathbb{R}^3$ and a moment indication $M = (m_x, m_y, m_z) \in \mathbb{R}^3$.

For following explanations, the robot's observation for a current position is denoted by Obs=(Img; F; M). To accurately capture the contact forces and generate smooth movements, high-frequency communication (Real Time Data Exchange) may be used between the sensor devices (cameras 202 and force sensor 120) and the controller 106.

For example, force and torque (moment) measurements are sampled at 500 Hz and commands are sent at the actuators with 125 Hz. The end-effector fingers 203 form a gripper whose pose is denoted by L. Specifically, $L \triangleq [L_{pos}, L_{ang}]$, where $L_{pos} \triangleq (x_0, y_0, z_0)$ is the gripper's location, and $L_{ang} \triangleq (\theta_0^x, \theta_0^y, \theta_0^z)$ is its pose. The robot's action in Cartesian space is defined by $(\Delta x, \Delta y, \Delta z, \Delta \theta_x, \Delta \theta_y, \Delta \theta_z)$ where $\Delta x$, $\Delta y$ and $\Delta z$ are the desired corrections needed for the EEF in the Cartesian space with respect to the current location. This robot action specifies the robot's movement from a current (or origin) pose (in particular a current position) to a target pose (in particular to a target position).

The two-camera scheme, i.e. having for each robot position considered an image data element which comprises two images, allows recovering the distance between two points shown in the images, i.e. allows avoiding the vision ambiguity problem which arises when trying to recover the distance between two points in world coordinates without depth information using a single image.

According to various embodiments, backward learning is used (e.g. by the controller 106) wherein images of the two cameras 202 are used to collect training data (specifically images) not only after touching the surface 115 but also along the moving trajectory. This means that collecting a training data element, the controller 106 places the robotic arm in its final (target) position $L_{final}$, i.e. when the plug 116 is inserted into the socket 114 (or similarly for any intermediate target for which the machine learning model 112 should be trained). (It should be noted that using the cameras 202, a target image data element may be collected in this position which is used according to various embodiments as described below.) Then, for each training data element, two points are sampled from a probability (e.g. normal) distribution: one is $T_{high}$, which is positioned in a random location above the socket, and the second one is $T_{low}$ which is randomly positioned around the socket's height.

A correction for this training data element is defined by $\Delta_{correction} \triangleq L_{final} - T_{random}$ where $T_{random}$ is a high or low point (i.e. $T_{high}$ or $T_{low}$). A training data set, denoted by D is built based on a set of training tasks $\tau \triangleq \{\tau_i\}_{i=1}^{N_\tau}$, where for each task $\tau_i$, there is a corresponding $L_{final}^i$. For each task, a randomized set of points $$\{T_{\tau_i,j}\}_{j=1}^{N_{\tau_i}}$$

is generated, yielding starting and end points for tasks and the initial random points $$D \triangleq \bigcup_{\tau_i \in \tau} \{D_{\tau_i,j}\}_{j=1}^{N_{\tau_i}}$$

(where j=high, low) and $D_{\tau_i,j} \triangleq [L_{final}^i, T_{\tau_i,j}]$. For each $D_{\tau_i,j}$ a corresponding correction $\Delta_{\tau_i,j} \triangleq L_{final}^i - T_{\tau_i,j}$ is defined. Algorithm 1 gives a detailed example for data collection and general backward learning for a task $\tau$.

```
                              Algorithm 1

Input: Maximum Randomized Location
      r₀ = 10[mm]: Maximum Randomized Angle
      θ₀ = 10°; Maximum Height z_max = 50[mm]:
      Force threshold F_th: Momentum threshold
      M_th; Points record P_x; Reaching time = t_max,
      number of data points Nτ, Buffer of Data D
 1 Init: Insert plug into the hole, register final pose
   L_final X₀        Θ₀
              ⌢         ⌢
 2 Set: (x₀,y₀,z₀,θ_x0,θ_y0,θ_z0) = L_final 3 for i ← 1, . . . ,N_τ do
 4   p⁰_x, p¹_x ~ N(X₀,r₀)
 5   p⁰_Θ, p¹_Θ ~ N(Θ₀,θ₀)
 6   z¹ ~ Uniform[z₀, z_max] random height above z₀
 7   Set target T^i_high = (p⁰_x,z₁,p⁰_Θ)
 8   Set target T^i_low  = (p¹_x,z₀,p¹_Θ)
 9   for j ← [high, low] do
10     Move Robot to T^i_j using an impedance
       controller
11     while Robot did not reach T^i_j do
12       if time mod t_max/P_x; then
13         Register Pose E = {x, y, z, θ_x, θ_y, θ_z}
14         Capture two 45° cameras into Img
15         Capture force F and momentum M
16         Set Obs = {Img, F, M}
17         Set Action_i = {L_final − E}
18         Push {Obs, Action} into D
19       end
20     end
21   end
22   return B
23 end
```

According to algorithm 1, force sensor data is gathered. That is not necessary according to various embodiments, in particular those which operate with target image data elements as described further below with reference to FIG. 5.

According to various embodiments, the machine learning model 112 comprises multiple components, one of them being an encoder network which the controller 106 uses to determine an encoding for each image data element Img.

Figure 3:
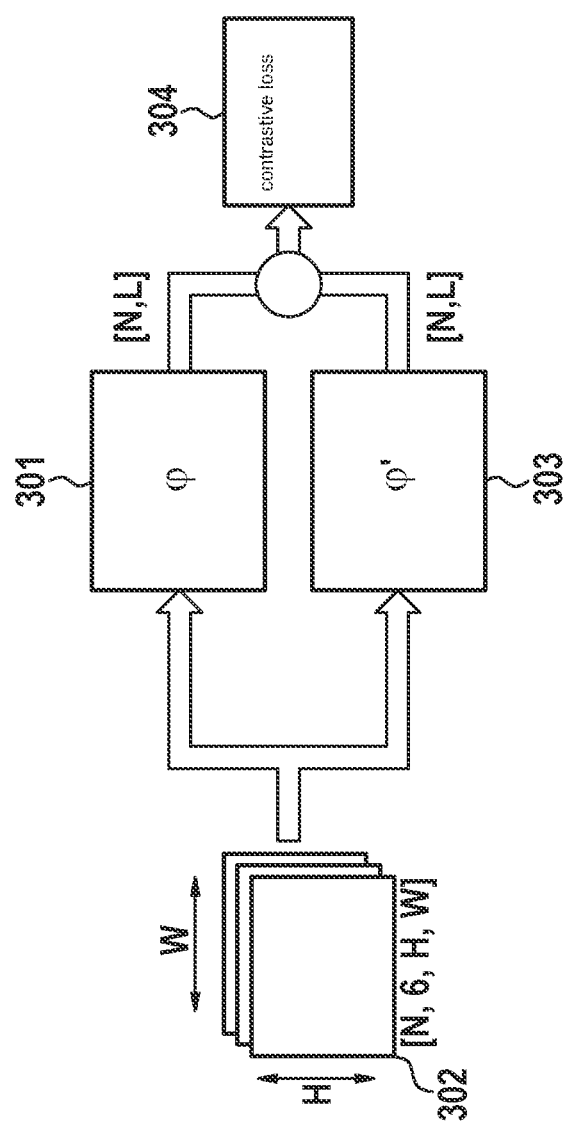
FIG. 3 illustrates the training of an encoder network according to an example embodiment of the present invention.

FIG. 3 illustrates the training of an encoder network 301 according to an embodiment.

The encoder network 301 is for example a convolutional neural network, e.g. having a ResNet18 architecture.

The encoder network 301 (realizing the function ϕ( ) is trained using a contrastive loss, and one or both of a delta policy loss and a relation data loss, so for example according to the following loss:

$$\text{loss} = l_{contrastive} + l_{delta} + l_{relation}.$$

These loss components are described in the following.

Contrastive learning, i.e. training based on contrastive loss, is a framework of learning representations that obey similarity or dissimilarity constraints in a dataset that map onto positive or negative labels, respectively. A possible contrastive learning approach is Instance Discrimination, where an example and an image are a positive pair if they are data-augmentations of the same instance and negative otherwise. A key challenge in contrastive learning is the choice of negative samples, as it may influence the quality of the underlying representations learned.

According to various embodiments, the encoder network 301 is trained (e.g. by the controller 106 or by an external device to be later stored in the controller 106) using a contrastive technique such that it learns relevant features for the task at hand without any specific labels. An example is InfoNCE loss (NCE: Noise-Contrastive Examination). Thereby, by stacking two images from the two cameras 202 to an image data element 302, a depth registration of the plug 113 and socket 114 are obtained. This depth information is used to augment the image data element in various different ways. From the original (i.e. non-augmented image data element) and one or more augmentations obtained in this manner, pairs of image data elements are sampled, wherein one element of the pair is supplied to the encoder network 301 and the other is supplied to another version 303 of the encoder network. The other version 303 realizes the function ϕ' which has for example the same parameters as the encoder network 301 and is updated using a Polyak averaging according to ϕ'=ϕ'+(1−m)ϕ with m=0.999 (where ϕ, ϕ' have been used to represent the weights of the two encoder network versions 301, 302).

The two encoder network versions 301, 302 each output a representation (i.e. embedding) of size L for the input data element 302 (i.e. a 2×L output of the pair). Doing this for a batch of N image data elements (i.e. forming a pair of augmentations or original and augmentation for each image data element), i.e. for training input image data of size N×6×H×W gives an N pairs of representations output by the two encoder network versions 301, 302 (i.e. representation output data of size 2×N×L). Using these N pairs of representations, the contrastive loss of the encoder network 301 is calculated by forming positive pairs and negative pairs from the representations included in the pairs). Here, two representations are a positive pair if they were generated from the same input data element 302 and are a negative pair if they were generated from different input data elements 302. This means that a positive pair holds two augmentations of the same original image data element or holds an original image image data element and a augmentation thereof. All other pairs are negative pairs.

For determining the contrastive loss 304, a similarity function sim(·) which measures the likeness (or distance between two embeddings is used. It may use Euclidean distance (in latent space, i.e. space of the embeddings) but more complicated functions may be used, e.g. using a kernel. The contrastive loss is then for example given by the sum over i, j of $$\ell_{i,j} = -\log \frac{\exp(sim(z_i, z_j)/\tau)}{\sum_{k=1}^{2N} {}_{[k \neq i]} \exp(sim(z_i, z_k)/\tau)}$$

where the $z_i$ are the embeddings. $\tau$ is here a temperature normalization factor (not to be confused with the task $\tau$ used above).

Figure 4:
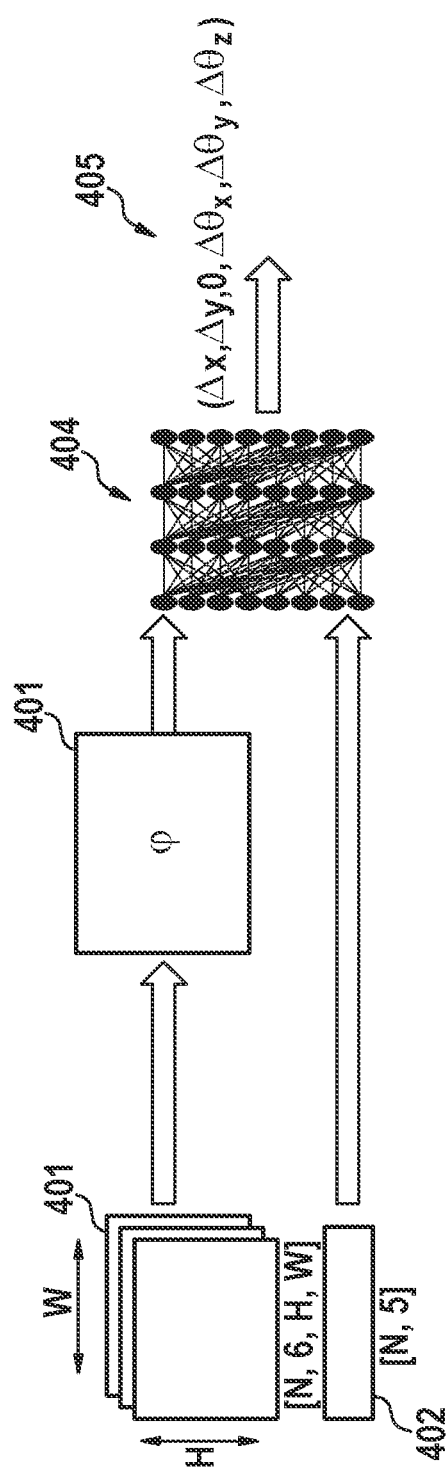
FIG. 4 shows the determination of a delta movement from an image data element and a force input, according to an example embodiment of the present invention.

FIG. 4 shows the determination of a delta movement 405 from an image data element 401 and a force input 402.

The delta movement $\Delta=(\Delta x, \Delta y, 0, \Delta\theta_x, \Delta\theta_y, \Delta\theta_z)$ is the robot action $\Delta=(\Delta x, \Delta y, \Delta z, \Delta\theta_x, \Delta\theta_y, \Delta\theta_z)$ without the movement in z direction since, according to various embodiments, the controller 106 controls the movement in z direction $\Delta z$ independently from other information, e.g. using the height of the table where the socket 114 is placed from prior knowledge or from the depth camera.

In this case, the encoder network 403 (corresponding to encoder network 301) generates an embedding for the image data element. The embedding is passed, together with the force input 402, to a neural network 404 which provides the delta movement 405. The neural network 404 is for example a convolutional neural network and is referred to as delta network and is said to implement a delta (control) policy.

The delta loss $l_{delta}$ for training the encoder network 403 (as well as the delta network 404) is determined by having ground truth delta movement labels for training input data elements (comprising an image data element 401 and a force input 402, i.e. what was denoted above, in particular in algorithm 1, by Obs=(Img; F; M)). The training data set D generated by algorithm 1 includes the training input data elements Obs and the ground truth labels for the delta loss.

Figure 5:
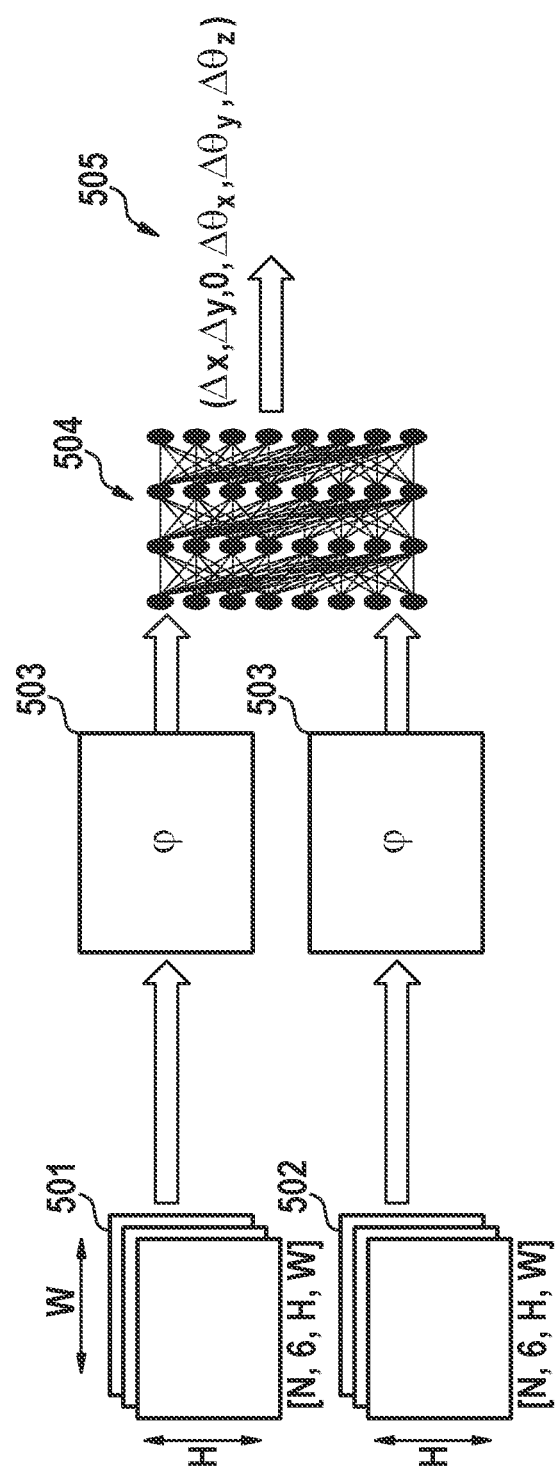
FIG. 5 shows the determination of a delta movement from two image data elements, according to an example embodiment of the present invention.

FIG. 5 shows the determination of a delta movement 505 from two image data elements 501, 502.

In this case, the encoder network 503 (corresponding to encoder network 301) generates an embedding for each image data element 501, 502. The embeddings are passed to a neural network 504 which provides the delta movement 505. The neural network 504 is for example a convolutional neural network and is referred to as relation network and is said to implement a relation (control) policy.

The relation loss $l_{relation}$ for training the encoder network 503 (as well as the relation network 504) is determined by having ground truth delta movement labels for pairs of image data elements 501, 502. The ground truth delta movement label for a pair of image data elements 501, 502 may for example be generated by taking the difference between the ground truth delta movement labels (i.e. the actions) included for the image data elements in the data set D generated by algorithm 1.

This means that for training with the relation loss the data set D is used to calculate the delta movement between two images of the same plugging task, $Img_i$ and $Img_j$, with $j \neq k$ by calculating the ground truth by the difference $\Delta_{\tau k,j} = \Delta_{\tau i,j} - \Delta_{\tau i,k}$. In case $Img_i$ and $Img_j$ are augmented for this training, augmentations are used which are consistent.

The relation loss $l_{relation}$ facilitates one-shot learning as well as enables multi-step insertion and improves the exploitation of the collected data.

When trained, the encoder network 403 and the delta network 404, used as described with reference to FIG. 4 to derive a delta movement from an image data element 401 and a force input 402, implement what is referred to as delta (control) policy.

Similarly, the trained encoder network 503 and the relation network 504, used as described with reference to FIG. 5 to derive a delta movement from an image data element 501 (for a current position) and an image data element 502 (for a target position) implement what is referred to as relation (control) policy.

The controller may use the delta policy or the relation policy as a residual policy πResidual in combination with a main policy πMain. So, for inference, the controller 106 uses the encoder network 403, 503 for the delta policy or the relation policy. This may be decided depending on the use-case. For example, for one-shot or multi-step insertion tasks, the relation policy (and relation architecture according to FIG. 5) is used since it can generalize better in these tasks. For other tasks, the delta policy (and delta architecture of FIG. 4) is used.

Following the main policy, the controller 106 approximates the location of the hole, i.e. for example localizes the holes, sockets, threads, etc. in the scene, for example from images and uses, for example, a PD controller to follow a path calculated from the approximation.

It then activates the residual policy, e.g. at a certain R of the plug 113 from the surface 115 and does the actual insertion according to the residual policy. An action of the residual policy is a delta movement $\Delta=(\Delta x, \Delta y, 0, \Delta\theta_x, \Delta\theta_y, \Delta\theta_z)$.

Algorithm 2 gives a detailed example of this procedure.

| Algorithm 2 |
| --- |
| Input: Target Point T; Transition Radius R; Final position image $Img_F$; Lowering rate $\Delta_Z$; Final height in z-axis $z_{final}$; Choose either $\pi_{Residual} = \pi_{Delta}$ (FIG. 4) or $\pi_{Relation}$ (FIG. 5) according to task in hand. |
| 1  Init: NextPoint = T, FinishFlag = False |
| 2  while not FinishFlag do |
| 3      Robot move to NextPoint |
| 4      CurrentPoint = Measure (x, y, z, $\theta^x$, $\theta^y$, $\theta^z$) |
| 5      if dist(CurrentPoint, T) < R then |
| 6          $\Delta = \pi_{Residual}(O, Img_F)$ |
| 7          $\delta_z = (0, 0, R/\Delta_z, 0, 0, 0)$ |
| 8          NextPoint = CurrentPoint + $\Delta + \delta_z$ |
| 9          if z < $z_{final}$ then |
| 10             FinishFlag = True |
| 11         end |
| 12     end |
| 13 end |

According to various embodiments, in order to improve robustness as well as for generalization over colour and shape, various augmentations for training data elements may be used. The order as well as the properties of each augmentation has a large effect on generalization. For
 visual augmentation (i.e. augmentation of training image data), this may include, for training based on the delta loss and the relation loss, resize, random crop, colour jitter, translation, rotation, erase and
 random convolution. For the contrastive loss, exemplary augmentations are random resized crop, strong translation, strong rotation and erase. Similar augmentations may be used for training data elements within the same batch. Regarding force augmentation (i.e. augmentation of training force input data), the direction of vectors (F, M), rather than their magnitude, is typically the more important valuable factor. Therefore, according to various embodiments, the force input 402 to the delta network is the direction of the force and moment vectors. These may be augmented for training (e.g. by jittering).

As mentioned above, the relation policy may in particular be used for a multi-step task, e.g. multi-step insertion. It should be noted that in a multi-step insertion tasks, like locking a door, it is typically harder to collect training data and verify that each step can be completed.

According to various embodiments, for a multi-step task, images are pre-saved for each target including one or more intermediate targets and a final target. Then, for each target that is currently to be achieved (depending on the current step, i.e. according to a sequence of intermediate targets and, as last element, the final target), an image data element is taken for the current position (e.g. by taking images from both cameras 202) and fed, together with the image (or images) for the target, to the encoder network 503 and a delta movement is derived by the relation network 504 as described with reference to FIG. 5.

Figure 6:
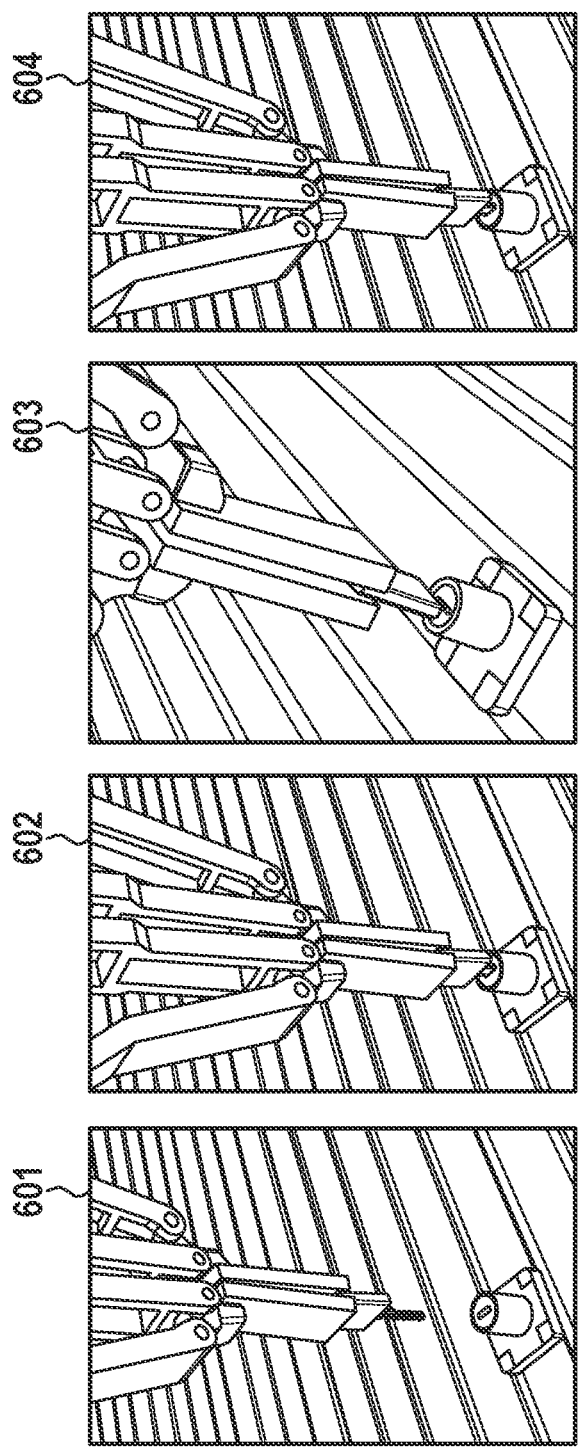
FIG. 6 illustrates an example of a multi-step insertion task, according to the present invention.

FIG. 6 illustrates an example of a multi-step insertion task.

In the example of FIG. 6, a task to lock a door, the task is composed of three steps starting from an initial position 601: inserting the key 602, turning the lock 603, and then turning back 604. For each step, an image of the state is taken with the two (e.g. 45-degree) cameras 202 and pre-saved. The execution of the task follows algorithm 2 with the relation policy and a similarity function to switch between steps. For example, an intermediate target is deemed to be reached when the similarity between images taken and the pre-saved target images for the current step is below a threshold.

Even if regular backward data collection (e.g. according to algorithm 1) is used and the the locking and insertion states are themselves not visited in the training (only visiting states above or touching the hole surface), the controller 106 can successfully perform the task in this manner.

Figure 7:
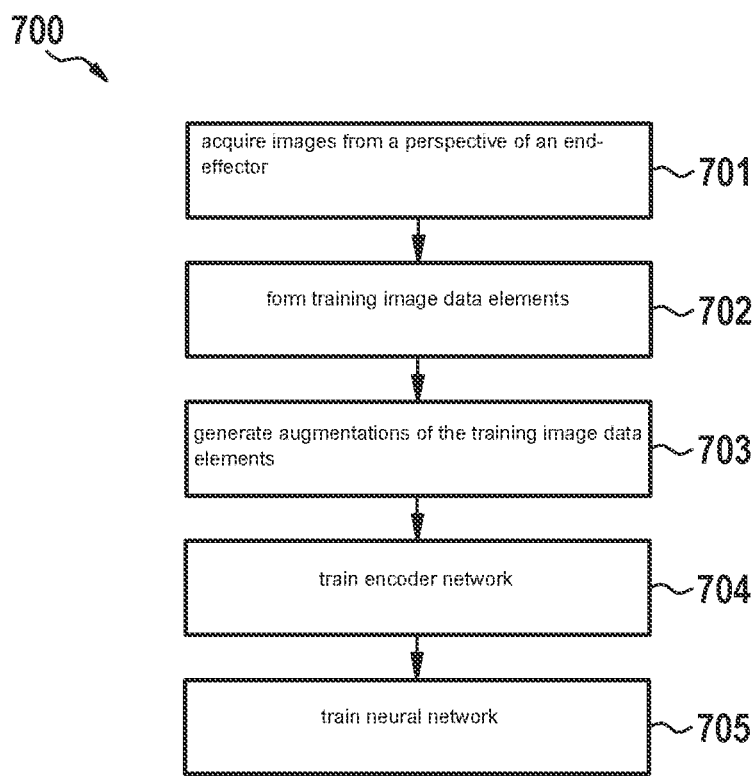
FIG. 7 shows a flow diagram 700 illustrating a method for training a machine learning model to derive a movement vector for a robot from image data, according to an example embodiment of the present invention.

In summary, according to various embodiments, a method is provided as illustrated in FIG. 7.

FIG. 7 shows a flow diagram 700 illustrating a method for training a machine learning model to derive a movement vector for a robot from image data.

In 701, images from a perspective of an end-effector of the robot are acquired.

In 702, training image data elements are formed from the acquired images.

In 703, augmentations of the training image data elements are generated to form augmented image data elements.

In 704, an encoder network is trained by a first training set of image data elements comprising the training image data elements and the augmented image data elements using contrastive loss, wherein, for an image data element of the first training set, another image data element is a positive sample if the other image data element is an augmentation of the image data element and is a negative sample else.

In 705, a neural network is trained from training data elements of a second training set, wherein each training data element of the second training set comprises at least one respective image data element and a respective ground truth movement vector, by feeding, for each training data element, the at least one image data element to the trained encoder network, inputting an embedding output provided by the encoder network in response to the at least one image data element and training the neural network to reduce a loss between movement vectors output by the neural network in response to the embedding outputs for the training data elements and the respective ground truth movement vectors for the training data elements.

The method of FIG. 7 may be performed by one or more computers including one or more data processing units. The term "data processing unit" can be understood as any type of entity that allows the processing of data or signals. For example, the data or signals may be treated according to at least one (i.e., one or more than one) specific function performed by the data processing unit. A data processing unit may include an analogue circuit, a digital circuit, a composite signal circuit, a logic circuit, a microprocessor, a micro controller, a central processing unit (CPU), a graphics processing unit (GPU), a digital signal processor (DSP), a programmable gate array (FPGA) integrated circuit or any combination thereof or be formed from it. Any other way of implementing the respective functions may also be understood as data processing unit or logic circuitry. It will be understood that one or more of the method steps described in detail herein may be executed (e.g., implemented) by a data processing unit through one or more specific functions performed by the data processing unit.

Various embodiments may receive and use image data from various visual sensors (cameras) such as video, radar, LiDAR, ultrasonic, thermal imaging etc. Embodiments may be used for training a machine learning system and controlling a robot, e.g. a robotic manipulators autonomously to achieve various inserting tasks under different scenarios. It should be noted that after training for an inserting task, the neural network may be trained for a new inserting task which reduces training time compared to training from scratch (transfer learning capabilities). Embodiments are in particular applicable to the control and monitoring of execution of manipulation tasks, e.g., in assembly lines.

According to one embodiment, the method is computer-implemented.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for training a machine learning model to derive a movement vector for a robot from image data, comprising the following steps:

acquiring images from a perspective of an end-effector of the robot;

forming training image data elements from the acquired images;

generating augmentations of the training image data elements to form augmented image data elements;

training an encoder network by a first training set of image data elements including the training image data elements and the augmented image data elements using contrastive loss, wherein, for each image data element of the first training set, another image data element is a positive sample when the other image data element is an augmentation of the image data element, and is a negative sample otherwise; and training a neural network from training data elements of
a second training set, wherein each training data element of the second training set includes at least one
respective image data element and a respective ground
truth movement vector, wherein the training is by
feeding, for each training data element, the at least one
image data element to the trained encoder network,
inputting an embedding output provided by the encoder
network in response to the at least one image data
element, and training the neural network to reduce a
loss between movement vectors output by the neural
network in response to the embedding outputs for the
training data elements and the respective ground truth
movement vectors for the training data elements.

2. The method of claim 1, further comprising forming the training image data elements to each comprise at least one acquired image, wherein the generating of the augmentations of the training image data elements includes at least one of resizing, cropping, colour jittering, translating, rotating, partially erasing, and processing by a random convolution of the at least one acquired image.

3. The method of claim 1, further comprising forming the training image data elements to each include two acquired images, wherein the two acquired images are taking for the same position of the end-effector of the robot by two different cameras attached to the end-effector.

4. The method of claim 1, wherein each of the training data elements of the second training set includes an image data element and a force and moment input.

5. The method of claim 1, wherein each of the training data elements of the second training set includes two image data elements.

6. A robot controller configured to train a machine learning model to derive a movement vector for a robot from image data, the robot controller configured to:
  acquire images from a perspective of an end-effector of the robot;
  form training image data elements from the acquired images;
  generate augmentations of the training image data elements to form augmented image data elements;
  train an encoder network by a first training set of image data elements including the training image data elements and the augmented image data elements using contrastive loss, wherein, for each image data element of the first training set, another image data element is a positive sample when the other image data element is an augmentation of the image data element, and is a negative sample otherwise; and
  train a neural network from training data elements of a second training set, wherein each training data element of the second training set includes at least one respective image data element and a respective ground truth movement vector, wherein the training is by feeding, for each training data element, the at least one image data element to the trained encoder network, inputting an embedding output provided by the encoder network in response to the at least one image data element, and training the neural network to reduce a loss between movement vectors output by the neural network in response to the embedding outputs for the training data elements and the respective ground truth movement vectors for the training data elements.

7. A robot, comprising:
  a robot controller configured to train a machine learning model to derive a movement vector for the robot from image data, the robot controller configured to:
  acquire images from a perspective of an end-effector of the robot;
  form training image data elements from the acquired images;
  generate augmentations of the training image data elements to form augmented image data elements;
  train an encoder network by a first training set of image data elements including the training image data elements and the augmented image data elements using contrastive loss, wherein, for each image data element of the first training set, another image data element is a positive sample when the other image data element is an augmentation of the image data element, and is a negative sample otherwise; and
  train a neural network from training data elements of a second training set, wherein each training data element of the second training set includes at least one respective image data element and a respective ground truth movement vector, wherein the training is by feeding, for each training data element, the at least one image data element to the trained encoder network, inputting an embedding output provided by the encoder network in response to the at least one image data element, and training the neural network to reduce a loss between movement vectors output by the neural network in response to the embedding outputs for the training data elements and the respective ground truth movement vectors for the training data elements
  the end-effector, with at least one camera configured to acquire the images.

8. A non-transitory computer readable medium on which are stored instructions for training a machine learning model to derive a movement vector for a robot from image data, the instructions, when executed by a processor, causing the processor to perform the following steps:
  acquiring images from a perspective of an end-effector of the robot;
  forming training image data elements from the acquired images;
  generating augmentations of the training image data elements to form augmented image data elements;
  training an encoder network by a first training set of image data elements including the training image data elements and the augmented image data elements using contrastive loss, wherein, for each image data element of the first training set, another image data element is a positive sample when the other image data element is an augmentation of the image data element, and is a negative sample otherwise; and
  training a neural network from training data elements of a second training set, wherein each training data element of the second training set includes at least one respective image data element and a respective ground truth movement vector, wherein the training is by feeding, for each training data element, the at least one image data element to the trained encoder network, inputting an embedding output provided by the encoder network in response to the at least one image data element, and training the neural network to reduce a loss between movement vectors output by the neural network in response to the embedding outputs for the training data elements and the respective ground truth movement vectors for the training data elements.

* * * * *